United States Patent
Katou (10) Patent No.: US 7,421,891 B2
(45) Date of Patent: Sep. 9, 2008

(54) TIRE MONITOR RADIO CIRCUIT AND TIRE MONITOR SYSTEM

(75) Inventor: Michiya Katou, Ogaki (JP)

(73) Assignee: Pacific Industrial Co., Ltd., Ogaki-shi (JP)

( * ) Notice: Subject to any disclaimer, the term of this patent is extended or adjusted under 35 U.S.C. 154(b) by 208 days.

(21) Appl. No.: 11/525,924

(22) Filed: Sep. 25, 2006

(65) Prior Publication Data

US 2007/0265798 A1  Nov. 15, 2007

(30) Foreign Application Priority Data

Apr. 19, 2006  (JP)  .............................. 2006-115610

(51) Int. Cl.
  *G01M 17/02*  (2006.01)
(52) U.S. Cl. ...................... 73/146.8; 340/447
(58) Field of Classification Search ................ 73/146.8; 340/447
  See application file for complete search history.

(56) References Cited

U.S. PATENT DOCUMENTS 2,141,133 A * 12/1938 Gibbs ......................... 210/738
2,529,510 A * 11/1950 Manley ........................ 342/86
5,559,484 A *  9/1996 Nowicki et al. ............. 340/447
5,945,908 A *  8/1999 Nowicki et al. ............. 340/447

FOREIGN PATENT DOCUMENTS

| JP | A 2005-45451  | 2/2005 |
| JP | A 2005-119370 | 5/2005 |
| JP | A 2005-171720 | 6/2005 |

* cited by examiner

*Primary Examiner*—Andre J Allen
(74) *Attorney, Agent, or Firm*—Oliff & Berridge, PLC (57) ABSTRACT

A tire monitor radio circuit includes a control circuit delivering a binary digital baseband signal, a modulation circuit having an oscillation circuit generating a carrier wave and switched between an oscillatory and a non-oscillatory states, an antenna resonance circuit having a coil and a capacitor both connected together, a resistance damping circuit having a switching element and a resistance and connected to the antenna resonance circuit, the resistance damping circuit being switchable between an operative and an inoperative states, and a compensation circuit putting the resistance damping circuit into the operative state when the modulation circuit is switched to the non-oscillatory state, the compensation circuit returning the resistance damping circuit to the non-operative state when or before the modulation circuit has been or is switched to the oscillatory state. When he resistance damping circuit is on the operative state, resonance current of the damped oscillation in the antenna resonance circuit is applied to the resistance, and the resistance serves as a damper thereby to reduce statically determinate time of damped oscillation. As a result, the digital signal can accurately be detected from the carrier wave at the reception side. Consequently, reliability in the communication can be improved.

16 Claims, 9 Drawing Sheets

TIRE MONITOR RADIO CIRCUIT AND TIRE MONITOR SYSTEM

BACKGROUND OF THE INVENTION

1. Field of the Invention

The present invention relates to a tire monitor radio circuit for performing radio transmission to a tire pressure detector mounted on a wheel of a vehicle and a tire monitor system provided with the radio circuit.

2. Description of the Related Art

Tire monitor systems of the above-described type generally comprise a tire monitor device mounted on a body of a vehicle and tire pressure detectors mounted on respective tires of the vehicle. Information about inner pressure of each tire is transmitted by radio between the vehicle body and each wheel. JP-A-2005-119370 discloses one of such tire monitor systems. In one of known communication manners, a tire monitor device provided at the vehicle body side delivers a trigger signal by radio. In reply to the trigger signal, a tire pressure detector transmits results of detection of tire pressure by radio. In this case, the tire monitor device carries out an amplitude shift keying (ASK) modulation based on a digital baseband signal.

Furthermore, there is a time when a reception level of radio transmission from a first communication device is excessively high at a second communication device. In this case, for the purpose of improving reliability of radio communication accompanied by ASK modulation and demodulation, a technique is known which informs by radio the first communication device of the excessively high reception level so that transmission output of the first communication device is lowered. JP-A-2005-45451 discloses one of the above-described techniques.

Figure 9:
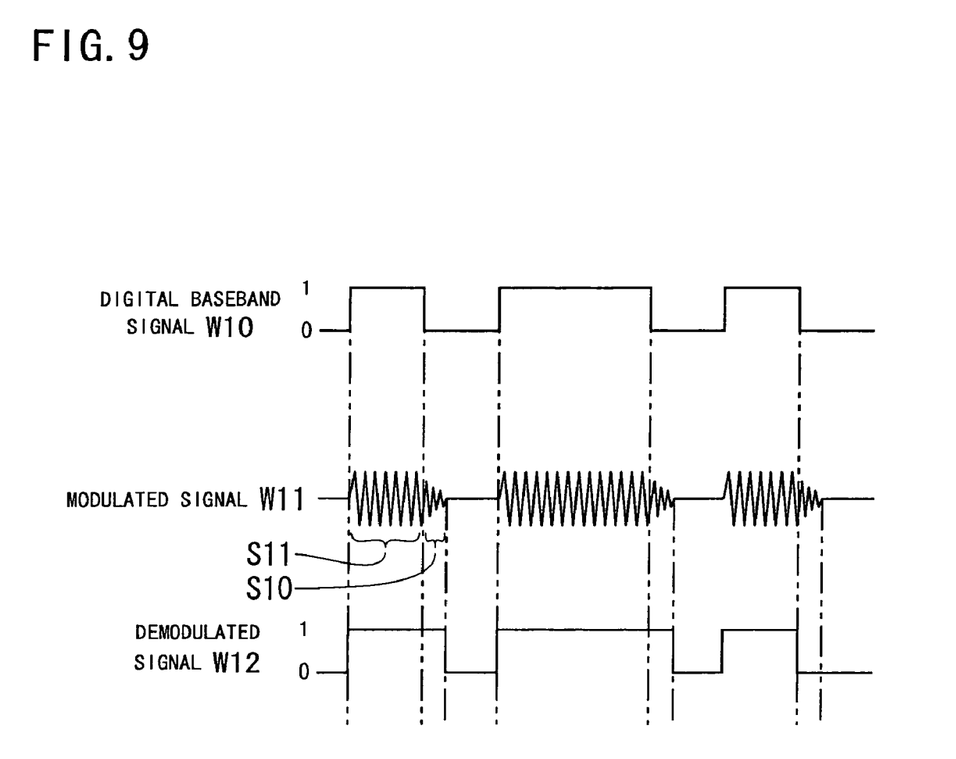
FIG. 9 is a time chart showing a modulated signal and a demodulated signal for a digital baseband signal in the use of a conventional tire monitor radio circuit.

The ASK modulation and demodulation result in the following problem. To modulate a digital baseband signal W10 as shown in FIG. 9, for example, a carrier wave is imparted to an antenna resonance circuit when the digital baseband signal W10 has turned to "1." When the signal W10 has turned to "0," impartment of carrier wave to the antenna resonance circuit is stopped. As a result, a modulated signal W11 shown in FIG. 9 is delivered from an antenna.

However, damped oscillation after stop of carrier wave impartment to the antenna resonance circuit is superimposed on the modulated signal W11. Accordingly, the modulated signal W11 contains an amplitude component S10 of damped oscillation and an amplitude component S11 corresponding to "1" of the digital baseband signal W10. When the signal is demodulated at the reception side, the amplitude component S10 is equated with the amplitude component S11, and a demodulated signal W12 is generated. Consequently, the demodulated signal W12 differs from the digital baseband signal W10, and accurate information cannot be transmitted. In the aforesaid conventional technique, however, a transmission output level is merely reduced. Accordingly, the difference between the amplitude component S11 corresponding to "1" of the digital baseband signal W10 and amplitude component S10 of damped oscillation cannot be rendered distinct. Moreover, since reduction in the transmission output renders the signal weaker against noise, accurate information still cannot be transmitted.

SUMMARY OF THE INVENTION

Therefore, an object of the present invention is to provide a tire monitor radio circuit which can improve communication reliability and a tire monitor system provided with the tire monitor radio circuit.

The present invention provides a tire monitor radio circuit performing radio transmission to a tire pressure detector mounted on a wheel of a vehicle. The tire monitor radio circuit comprises a control circuit delivering a binary digital baseband signal, a modulation circuit having an oscillation circuit generating a carrier wave, the modulation circuit switching between an oscillatory state where the carrier wave is delivered and a non-oscillatory state where the carrier wave is not delivered, based on inversion of a binary value of the digital baseband signal, an antenna resonance circuit which has a coil and a capacitor both connected together and is capable of resonating in response to the carrier wave delivered by the modulation circuit, a resistance damping circuit which has a switching element and a resistance and is connected to the antenna resonance circuit, the resistance damping circuit being switchable between an operative state where a resonance current of the antenna resonance circuit can be applied to the resistance and an inoperative state where the resonance current of the antenna resonance circuit cannot be applied to the resistance, and a compensation circuit putting the resistance damping circuit into the operative state when the modulation circuit is switched from the oscillatory state to the non-oscillatory state, the compensation circuit returning the resistance damping circuit to the non-operative state when or before the modulation circuit is switched from the non-oscillatory state to the oscillatory state.

In the tire monitor radio circuit of the present invention, the modulation circuit switches between the oscillatory state and the non-oscillatory state according to inversion of the binary value of the digital baseband signal delivered by the control circuit, whereby the carrier wave is modulated in response to the digital baseband signal. The resistance damping circuit provided with the switching element and the resistance is connected to the antenna resonance circuit. When the modulation circuit is switched from the oscillatory state to the non-oscillatory state, the resistance damping circuit is switched to the operative state, whereby resonance current of damped oscillation in the antenna resonance circuit is supplied to the resistance. In this case, the resistance serves as a damper thereby to reduce statically determinate time of damped oscillation. As a result, the digital signal can accurately be detected from the carrier wave at the reception side. Moreover, the resistance damping circuit is returned to the inoperative state when or before the modulation circuit has been or is switched from the non-oscillatory state to the oscillatory state. Accordingly, transmission output is not reduced, either. Consequently, the reliability in the communication can be improved by the above-described arrangement as compared with the conventional arrangement.

In a preferred embodiment, the coil of the antenna resonance circuit has two terminals, and the resistance damping circuit comprises the switching element and the resistance series-connected between both terminals of the coil. In this case, the resistance is conductively connected between the terminals of the coil of the antenna resonance circuit when the modulation circuit has been switched from the oscillatory state to the non-oscillatory state. As a result, the resonance current due to the damped oscillation flows to the resistance, whereupon electric energy is consumed and accordingly, statically determinate time of damped oscillation is reduced.

In another preferred embodiment, the capacitor of the antenna resonance circuit has two terminals, and the resistance damping circuit comprises the switching element and the resistance connected in series between both terminals of the capacitor. The resistance is conductively connected between the terminals of the capacitor of the antenna resonance circuit when the modulation circuit has been switched from the oscillatory state to the non-oscillatory state. In this case, too, the resonance current due to the damped oscillation flows to the resistance, whereupon electric energy is consumed and accordingly, statically determinate time of damped oscillation is reduced.

In further another preferred embodiment, the capacitor and the coil of the antenna resonance circuit are connected in series into an inductance-capacitance (LC) series circuit having two terminals, and the resistance damping circuit comprises the switching element and the resistance series-connected between both terminals of the LC series circuit. A closed circuit including the coil, capacitor and resistance is established in synchronization with the switch of the modulation circuit from the oscillatory to the non-oscillatory state. Consequently, the resonance current due to the damped oscillation flows to the resistance, whereupon electric energy is consumed and accordingly, statically determinate time of damped oscillation is reduced.

The invention also provides a tire monitor system which includes a tire pressure detector mountable on a wheel of a vehicle and a tire monitor device mountable on a vehicle body and comprising the above-described tire monitor radio circuit.

In the foregoing system, the tire monitor mounted on the vehicle body performs radio transmission to the tire pressure detector mounted on the wheel. The tire pressure detector responds, transmitting result of detection of tire pressure. The tire monitor device thus receives the detection result. Consequently, the tire pressure can be monitored at the vehicle body side.

BRIEF DESCRIPTION OF THE DRAWINGS

Other objects, features and advantages of the present invention will become clear upon reviewing the following description of the preferred embodiment, with reference to the accompanying drawings, in which.

DETAILED DESCRIPTION OF THE INVENTION

Figure 1:
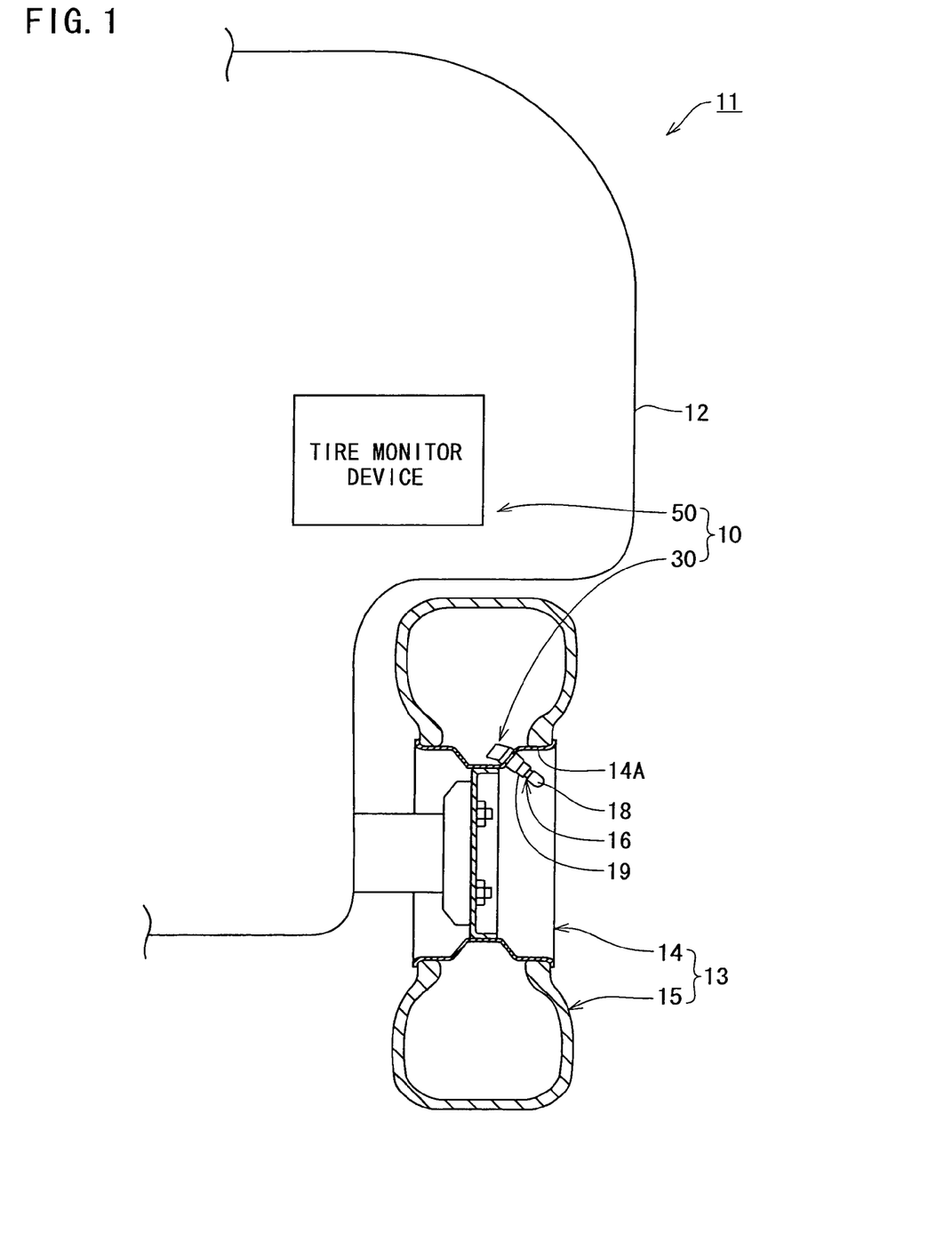
FIG. 1 is a conceptual view of a tire monitor system in accordance with an embodiment of the present invention.

A first embodiment of the present invention will be described with reference to FIGS. 1 to 5. FIG. 1 illustrates a tire monitor system 10 in accordance with the first embodiment of the invention. The tire monitor system 10 comprises, for example, four tire pressure detectors 30 provided on respective wheels 13 of a vehicle 11 such as automobile and a single tire monitor device 50 provided on a body 12 of the vehicle 11. Only one of the wheels 13 is shown in FIG. 1.

Figure 2:
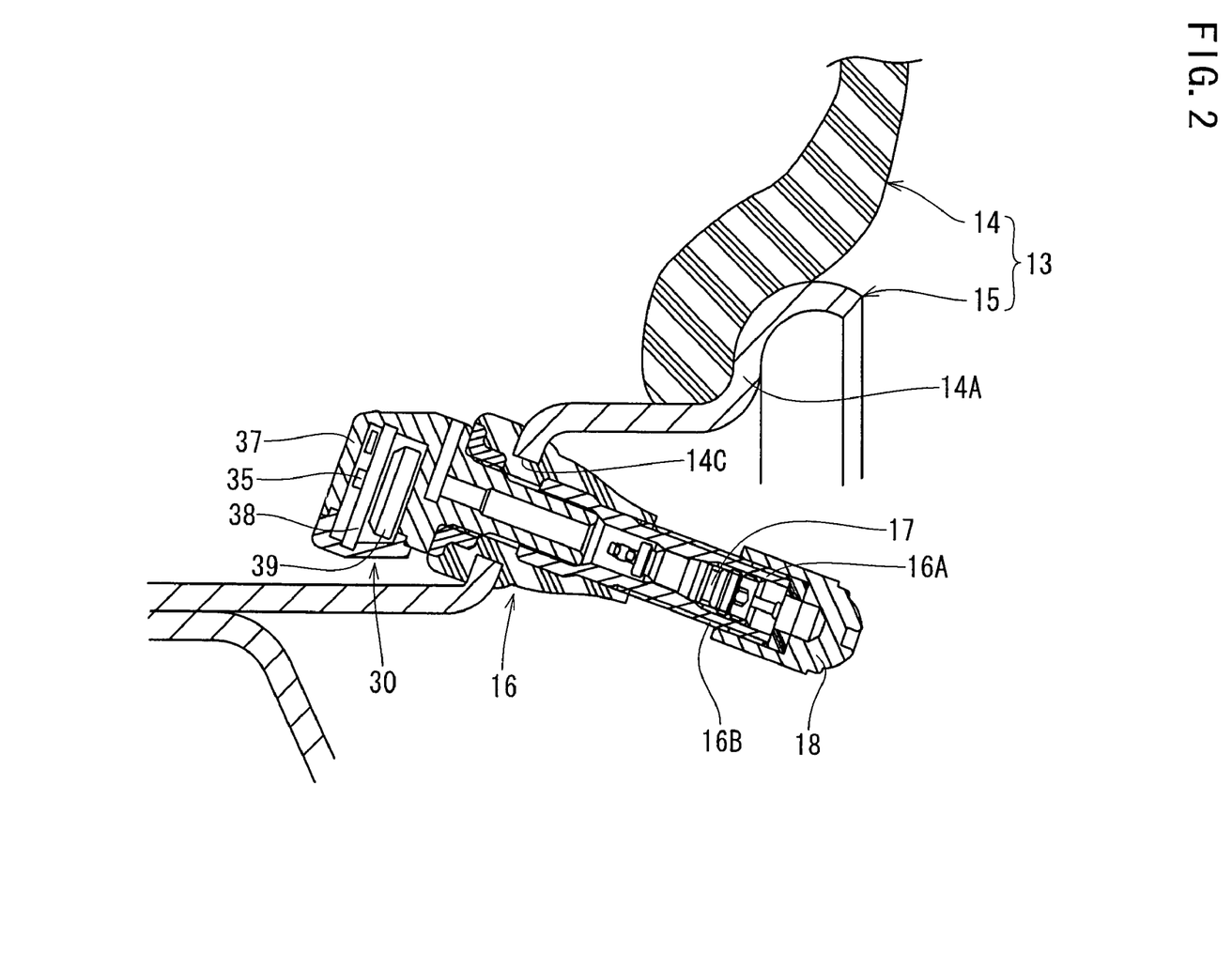
FIG. 2 is a sectional view of a wheel and tire pressure detector.

Each wheel 13 is comprised of a tire wheel 14 having a rim 14A and a tubeless tire 15 fitted with the rim 14A. The rim 14 is formed with a valve mount hole 14C as shown in FIG. 2. A tire valve 16 is inserted through and fixed to the valve mount hole 14C. The tire valve 16 comprises a cylindrical valve stem 16A with two open ends and a valve core 17 with a check-valve structure disposed in the valve stem 16A. The tire valve 16 has a distal end protruding to an inner circumferential surface side of the rim 14A. On the other hand, the tire valve 16 has a proximal end protruding to an outer circumferential surface side of the rim 14A and disposed in the tire 15. The tire valve 16 has an outer surface formed with a male thread 16B. A cap 18 is in threaded engagement with a distal end of the male thread 16B.

Figure 3:
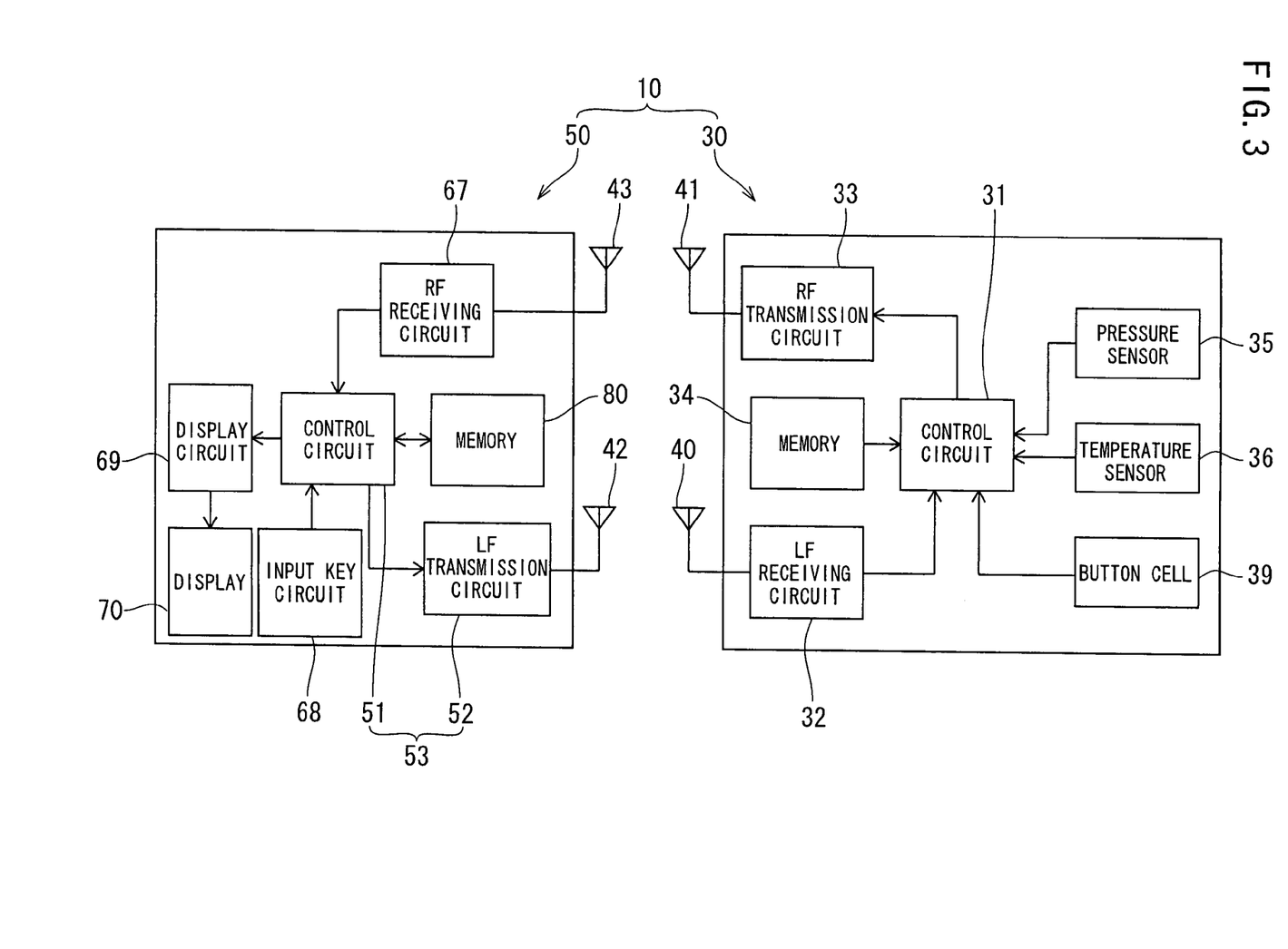
FIG. 3 is a block diagram showing an electrical arrangement of the tire monitor system.

The tire pressure detector 30 mounted on each wheel 13 is fixed to the proximal end of the tire valve 16. The tire pressure detector 30 comprises a case 37 fixed to the tire valve 16. A circuit board 38, a button cell 39 and the like are accommodated in the case 37. On the circuit board 38 are mounted a control circuit 31, a low-frequency (LF) receiving circuit 32, a radio frequency (RF) transmission circuit 33, a memory 34, a pressure sensor 35 and a temperature sensor 36 as shown in FIG. 3. Furthermore, the memory 34 stores identification data set for every tire pressure detector 30. The LF receiving circuit 32 and the RF transmission circuit 33 are provided with respective antennas 40 and 41.

When receiving an external command through the LF receiving circuit 32, the control circuit 31 is triggered and carries out a predetermined program, loading results of detection by the pressure sensor 35 and temperature sensor 36. The control circuit 31 adds identification data to detection data, transmitting the data to the RF transmission circuit 33 by radio.

The tire monitor device 50 is disposed, for example, in the rear of a dashboard (not shown) mounted on the vehicle body 12 and is connected to and supplied with electric power by a vehicle battery (not shown). The tire monitor device 50 includes a control circuit 51, a low-frequency (LF) transmission circuit 52, a radio-frequency (RF) receiving circuit 67, an input key circuit 68, a memory 80, a display circuit 69 and a display 70, as shown in FIG. 3. The LF transmission circuit 52 and the RF receiving circuit 67 are provided with respective antennas 42 and 43.

The LF transmission circuit 52 delivers a radio signal, and each tire pressure detector 30 transmits results of detection of an inner pressure and temperature of a tire by radio in reply to the signal. The RF receiving circuit 67 receives the results of detection of tire pressure and tire temperature. Furthermore, the control circuit 51 determines whether the tire pressure and tire temperature are unusual, thereby driving the display circuit 69 so that warning or the like is displayed on the display 70.

Figure 4:
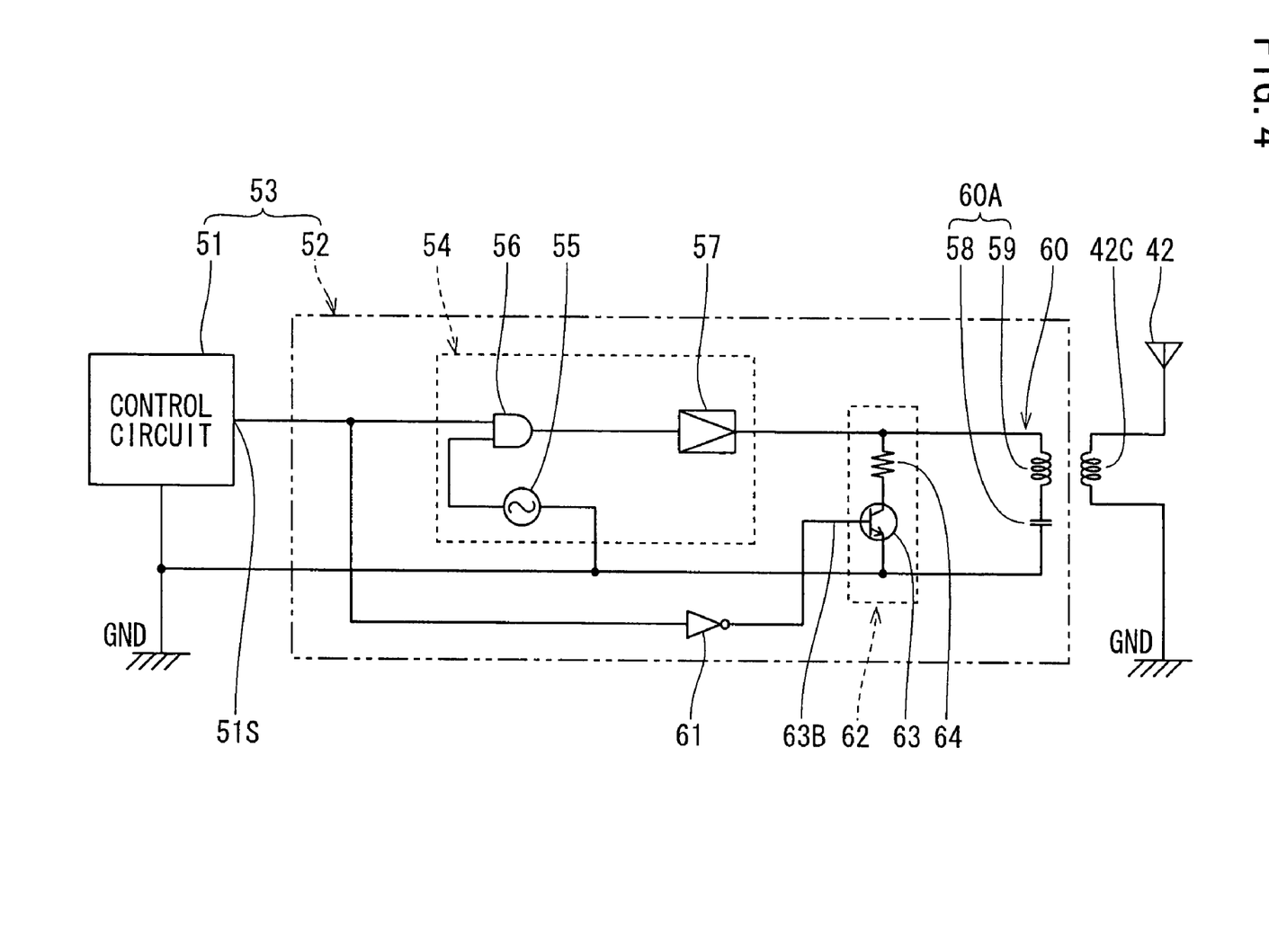
FIG. 4 is an electrical circuit diagram of a tire monitor radio circuit.

A tire monitor radio circuit 53 comprises the control circuit 51 and the LF transmission circuit 52. The control circuit 51 is composed of a digital circuit provided with a central processing unit (CPU; and not shown). The control circuit 51 is provided with a serial output port 51S from which a binary digital baseband signal is delivered to each tire pressure detector 30. When the binary digital baseband signal is at "0," the potential difference between the serial output port 51S and a ground (GND) is zero. When the binary digital baseband signal is at "1," the potential difference between the serial output port 51S and the GND is at a predetermined level.

The LF transmission circuit 52 includes a modulation circuit 54 and an antenna resonance circuit 60. The modulation circuit 54 includes an oscillation circuit 55, an AND circuit 56 and an amplifier circuit 57. The oscillation circuit 55 generates and supplies carrier waves to the AND circuit 56. More specifically, the AND circuit 56 includes a pair of input terminals. The oscillation circuit 55 is connected between one of the input terminals of the AND circuit 56 and the GND, changing a potential difference between the input terminal of the AND circuit 56 and the GND at predetermined intervals (125 kHz, for example). Furthermore, the serial output port 51S of the control circuit 51 is connected to the other input terminal of the AND circuit 56. As a result, when the digital baseband signal is at "1" and the amplitude of the carrier wave is at or above a predetermined potential difference relative to the GND, output of the AND circuit 56 is switched to an on-state. The output of the AND circuit 56 is switched to an off-state in other cases. As a result, when the digital baseband signal W1 becomes "1," a carrier wave is substantially delivered from the AND circuit 56. When the digital baseband signal becomes "0," output of the carrier wave from the AND circuit 56 is stopped. The output of the AND circuit 56 is amplified by the amplifier circuit 57 to be supplied as output of the modulation circuit 54 to the antenna resonance circuit 60.

The antenna resonance circuit 60 is connected to the output side of the modulation circuit 54 and includes a capacitor 58 and a coil 59 connected in series between output of the modulation circuit 54 and the GND. The antenna 42 has a coil 42C connectable to the coil 59 of the antenna resonance circuit 60 by electromagnetic induction.

A resistance damping circuit 62 is connected in parallel to an inductance-capacitance (LC) series circuit 60A between output of the modulation circuit 54 and the GND. The LC series circuit 60A comprises the capacitor 58 and the coil 59 both constituting the antenna resonance circuit 60. The resistance damping circuit 62 comprises a resistance 64 and a transistor 63 serving as a switching element. The resistance 64 and the transistor 63 are connected in series to each other. The transistor 63 is, for example, an NPN bipolar transistor and has a collector connected to output of the modulation circuit 54 via the resistance 64 and an emitter connected to the GND. Furthermore, the transistor 63 has a base 63B serving as an on-off control terminal in the invention. Between the base 63B and the serial output port 51S of the control circuit 51 is connected a NOT circuit 61 serving as a compensation circuit in the invention.

The tire monitor system 10 arranged as described above will operate in the following manner. When an ignition key switch of the vehicle 11 is turned on or regularly while the vehicle 11 is moving, the tire monitor device 50 asks each tire detector 30 of each wheel 13 for the results of detection of tire pressure and temperature. For this purpose, the tire monitor device 50 delivers a radio signal as a trigger for operating each tire pressure detector 30. More specifically, the control circuit 50 of the tire monitor device 50 delivers a binary digital baseband signal W1 (see FIG. 5) containing predetermined information to each tire pressure detector 30. When the binary digital baseband signal W1 becomes "1, " the modulation circuit 54 is, in response, switched between an oscillatory state where the modulation circuit 54 delivers a carrier wave to the antenna resonance circuit 60 and a non-oscillatory state where the modulation circuit 54 does not deliver the carrier wave. When the modulation circuit 54 is in the oscillatory state, the antenna resonance circuit 60 resonates so that radio waves are transmitted from the antenna 42. On the other hand, when the modulation circuit 54 is in the non-oscillatory state, the resonance of the antenna resonance circuit 60 is stopped, whereby transmission of radio waves from the antenna 42 is stopped. Thus, a modulated signal W2 (see FIG. 5) according to the digital baseband signal W1 is delivered from the antenna 42.

In response to the signal transmitted from the tire monitor radio circuit 53 of the tire monitor device 50, each tire pressure detector 30 delivers by radio the results of detection by the pressure and temperature sensors 35 and 36 from the RF transmission circuit 33. The tire monitor device 50 receives the detection results, determining defect in each tire and each tire pressure detector 30. Thus, according to the tire monitor system 10 of the invention, abnormality of each tire 15 can be monitored at the vehicle body side 12.

In order that information may accurately be transmitted from the tire monitor radio circuit 53 to each tire pressure detector 30, the following process is carried out in the tire monitor system 10. The resistance damping circuit 62 is switched between an operative state and a non-operative state in synchronization with the switching between an oscillatory state and a non-oscillatory state of the modulation circuit 54 during radio transmission by the tire monitor radio circuit 53. More specifically, when the digital baseband signal W1 becomes "0," output of the NOT circuit 61 is turned to the on-state, whereupon the transistor 63 is turned on and accordingly, the resistance damping circuit 62 is turned to the operative state. When the digital baseband signal W1 becomes "1," output of the NOT circuit 61 is turned to the off-state, whereupon the transistor 63 is turned off and accordingly the resistance damping circuit 62 is turned to the non-operative state. When the resistance damping circuit 62 is turned to the operative state, a closed circuit is established by the coil 59 and capacitor 58 of the antenna resonance circuit 60 and the transistor 63 and the resistance 64 of the resistance damping circuit 62. When resonance current due to damped oscillation of the antenna resonance circuit 60 flows through the closed circuit, the resistance 64 serves as a damper, thereby reducing statically determinate time of the damped oscillation.

Figure 5:
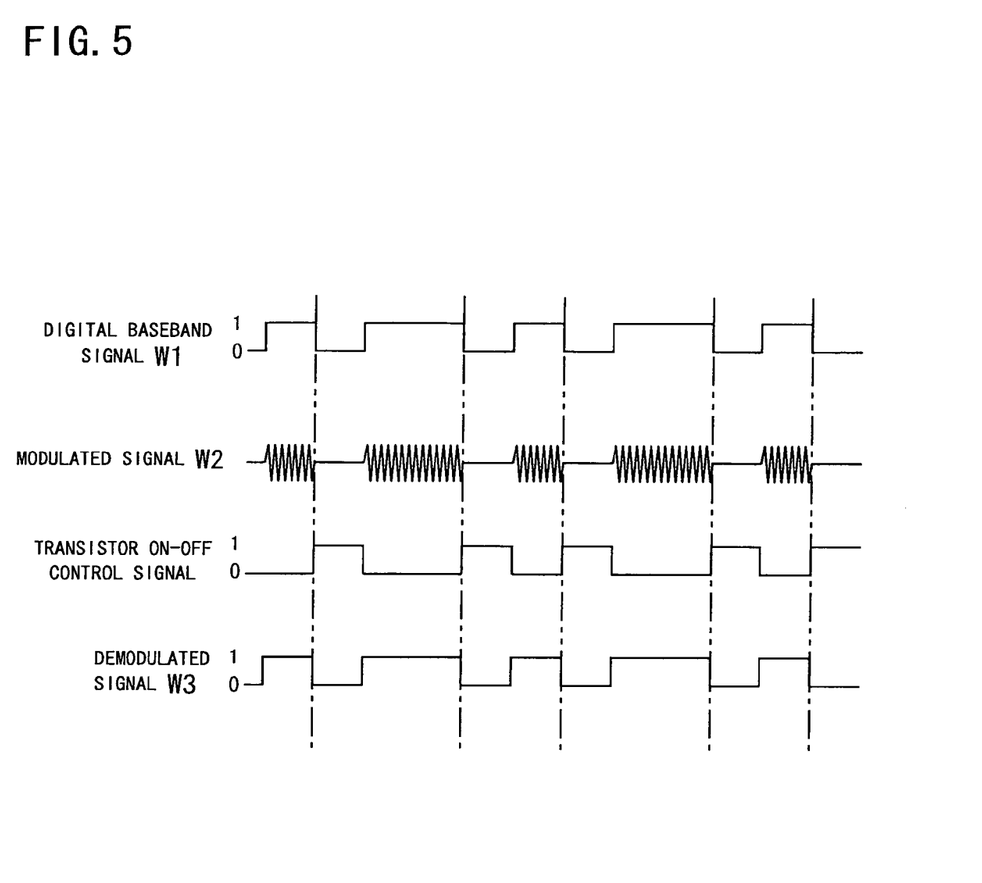
FIG. 5 is a time chart showing a modulated signal and a demodulated signal for a digital baseband signal.

Consequently, a modulated signal W2 to be delivered from the antenna 42 is steeply switched between an amplitude state and a non-amplitude state in synchronization with inversion of the digital baseband signal W1 from "1" to "0" as shown in FIG. 5, whereby a demodulated signal W3 demodulated by each tire pressure detector 30 based on the modulated signal W2 can accurately match the digital baseband signal W1. Moreover, when the modulation circuit 54 has been switched from the non-oscillatory state to the oscillatory state, the resistance damping circuit 62 is returned to the non-operative state, whereupon the transmission output is not turned down. Thus, the tire monitor system 10 of the embodiment can improve the reliability in the radio communication as compared with the conventional systems.

Figure 6:
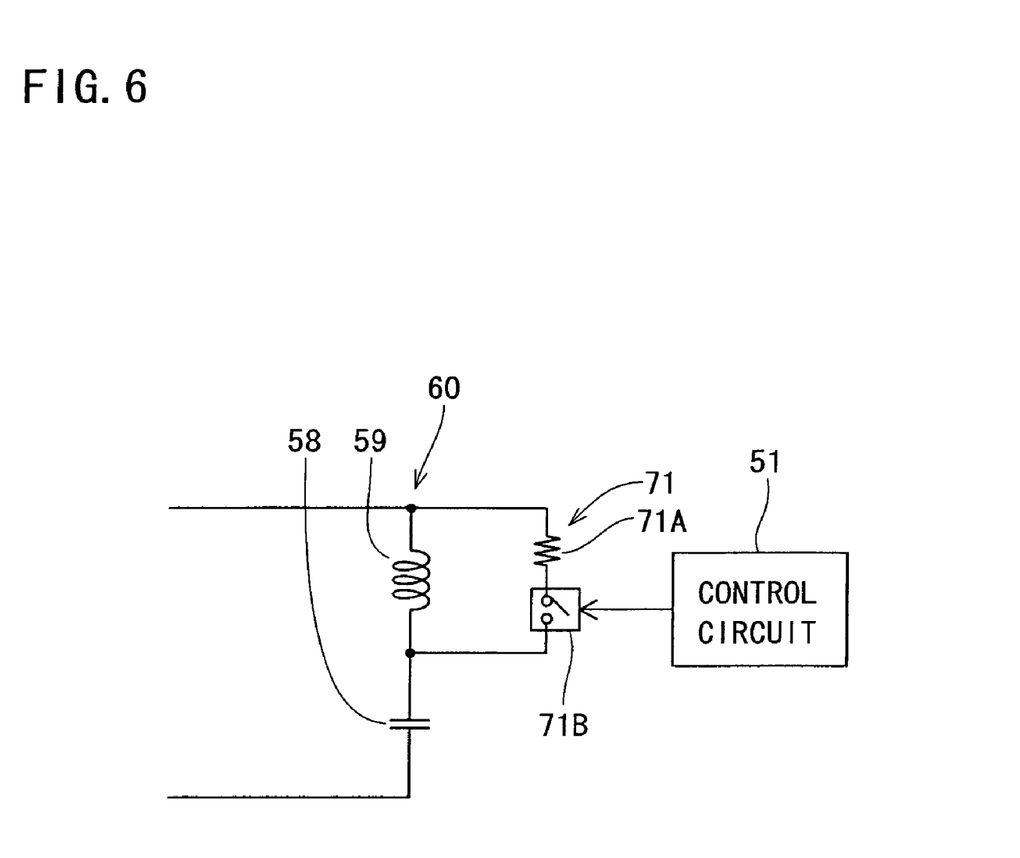
FIG. 6 is an electrical circuit diagram of an antenna resonance circuit in a second embodiment.

FIG. 6 illustrates a second embodiment of the invention. The second embodiment differs from the first embodiment mainly in the arrangement of a resistance damping circuit 71. More specifically, the resistance damping circuit 71 is connected in series with the switching element 71B and the resistance 71A between both terminals of the coil 59 of the antenna resonance circuit 60. The switching element 71B is designed to be on-off controlled in response to a signal from the control circuit 51. In this respect, a circuit connecting the control circuit 51 and the switching element 71B serves as a compensation circuit in the second embodiment of the invention.

According to the second embodiment, when the modulation circuit 54 has been switched from the oscillatory state to the non-oscillatory state, the resistance 71A is conductively connected between both terminals of the coil 59 of the antenna resonance circuit 60. Accordingly, resonance current due to damped oscillation flows into the resistance 71A, whereby electric energy is consumed. Consequently, statically determinate time of damped oscillation can be reduced.

Figure 7:
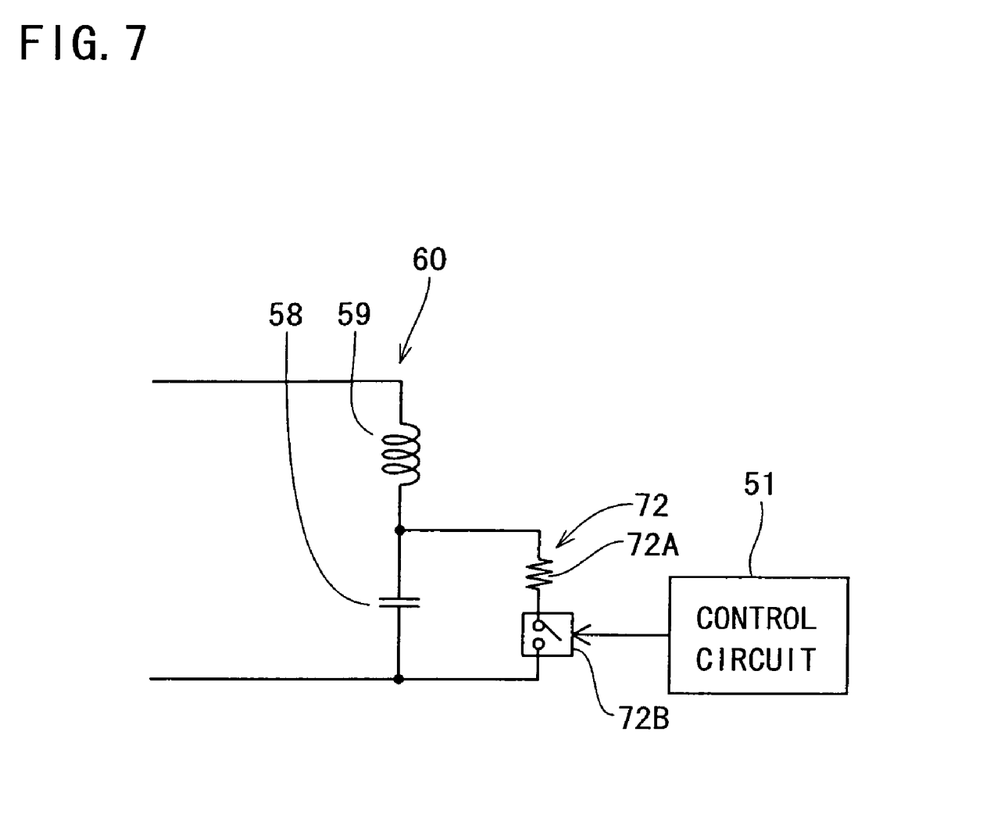
FIG. 7 is an electrical circuit diagram of an antenna resonance circuit in a third embodiment.

FIG. 7 illustrates a third embodiment of the invention. The third embodiment differs from the first embodiment mainly in the arrangement of a resistance damping circuit 72. More specifically, the resistance damping circuit 72 is connected in series with the switching element 72B and the resistance 72A between both terminals of the capacitor 58 of the antenna resonance circuit 60. Other arrangements of the third embodiment are same as those of the second embodiment. The third embodiment can achieve the same effect as the second embodiment.

Figure 8:
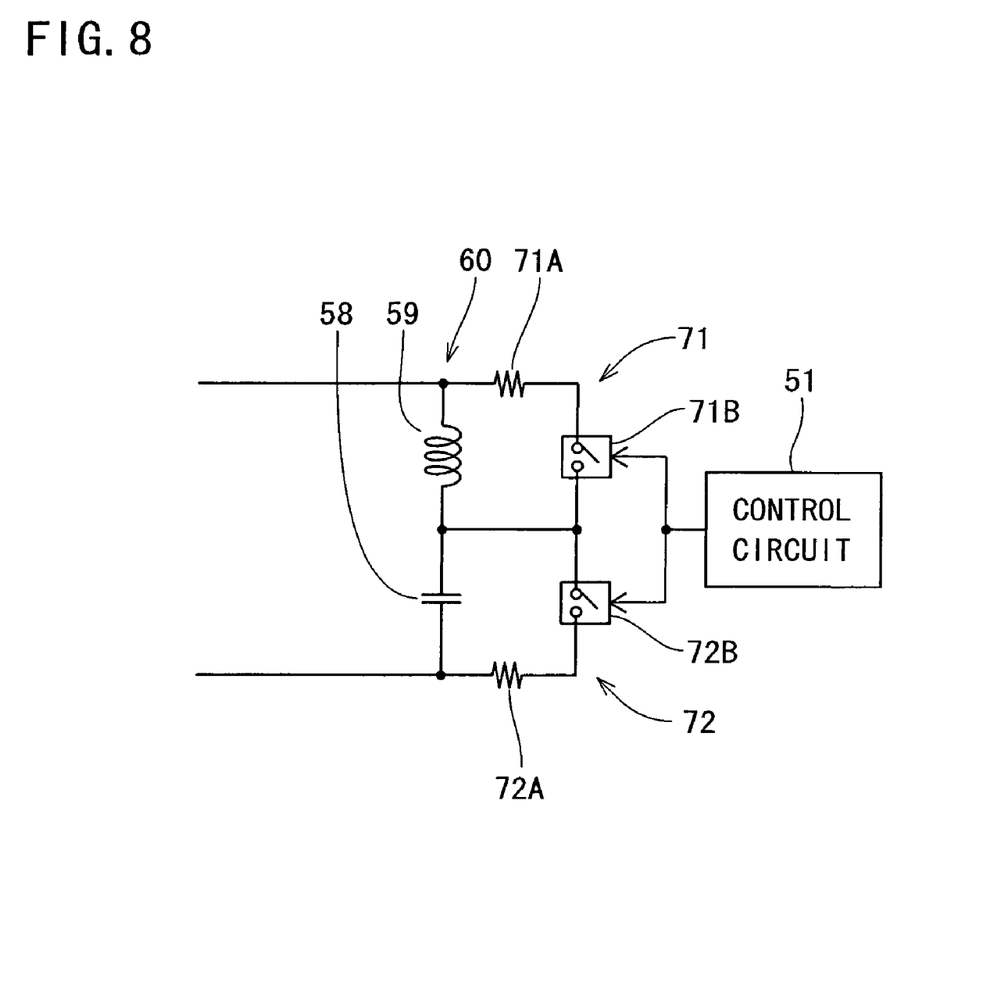
FIG. 8 is an electrical circuit diagram of an antenna resonance circuit in a fourth embodiment.

FIG. 8 illustrates a fourth embodiment of the invention. The tire monitor system of the fourth embodiment has an arrangement achieved by combination of the resistance damping circuits 71 and 72 of the second and third embodiments. Accordingly, the fourth embodiment can achieve the same effect as the second and third embodiments.

The invention should not be limited to the foregoing embodiments but encompasses the following modified forms. Furthermore, the invention can be modified in various forms in practice without departing from the gist thereof. Firstly, the transistor 63 is turned off in synchronization with the switch of the modulation circuit 54 from the oscillatory state to the non-oscillatory state in the first embodiment. However, for example, time measurement may start upon switch of the digital baseband signal W1 from "1" to "0." The transistor 63 may be turned on after a lapse of predetermined time so that the transistor 63 is turned off before the modulated circuit is switched from the oscillatory state to the non-oscillatory state. Secondly, although the transistor 63 is a bipolar transistor (see FIG. 4) in the first embodiment, the transistor 63 may be a field effect transistor (FET), instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A tire monitor radio circuit performing radio transmission to a tire pressure detector mounted on a wheel of a vehicle, the tire monitor radio circuit comprising:

a control circuit delivering a binary digital baseband signal;

a modulation circuit having an oscillation circuit generating a carrier wave, the modulation circuit switching between an oscillatory state where the carrier wave is delivered and a non-oscillatory state where the carrier wave is not delivered, based on inversion of a binary value of the digital baseband signal;

an antenna resonance circuit which has a coil and a capacitor both connected together and is capable of resonating in response to the carrier wave delivered by the modulation circuit;

a resistance damping circuit which has a switching element and a resistance and is connected to the antenna resonance circuit, the resistance damping circuit being switchable between an operative state where a resonance current of the antenna resonance circuit can be applied to the resistance and an inoperative state where the resonance current of the antenna resonance circuit cannot be applied to the resistance; and a compensation circuit putting the resistance damping circuit into the operative state when the modulation circuit is switched from the oscillatory state to the non-oscillatory state, the compensation circuit returning the resistance damping circuit to the non-operative state when or before the modulation circuit is switched from the non-oscillatory state to the oscillatory state.

2. The tire monitor radio circuit according to claim 1, wherein the coil of the antenna resonance circuit has two terminals and the resistance damping circuit comprises the switching element and the resistance connected in series between both terminals of the coil.

3. The tire monitor radio circuit according to claim 1, wherein the capacitor of the antenna resonance circuit has two terminals and the resistance damping circuit comprises the switching element and the resistance connected in series between both terminals of the capacitor.

4. The tire monitor radio circuit according to claim 2, wherein the capacitor of the antenna resonance circuit has two terminals and the resistance damping circuit comprises the switching element and the resistance connected in series between both terminals of the capacitor.

5. The tire monitor radio circuit according to claim 1, wherein the capacitor and the coil of the antenna resonance circuit are connected in series into an inductance-capacitance (LC) series circuit having two terminals, and the resistance damping circuit comprises the switching element and the resistance connected in series between both terminals of the LC series circuit.

6. The tire monitor radio circuit according to claim 2, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

7. The tire monitor radio circuit according to claim 3, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

8. The tire monitor radio circuit according to claim 4, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

9. The tire monitor radio circuit according to claim 5, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

10. A tire monitor system which includes a tire pressure detector mountable on a wheel of a vehicle and a tire monitor device mountable on a body of the vehicle so as to be capable of performing radio communication with the tire pressure detector, the tire monitor device comprising:

a control circuit delivering a binary digital baseband signal;

a modulation circuit having an oscillation circuit generating a carrier wave, the modulation circuit switching between an oscillatory state where the carrier wave is delivered and a non-oscillatory state where the carrier wave is not delivered, based on inversion of a binary value of the digital baseband signal;

an antenna resonance circuit which has a coil and a capacitor both connected together and is capable of resonating in response to the carrier wave delivered by the modulation circuit;

a resistance damping circuit which has a switching element and a resistance and is connected to the antenna resonance circuit, the resistance damping circuit being switchable between an operative state where a resonance current of the antenna resonance circuit can be applied to the resistance and an inoperative state where the resonance current of the antenna resonance circuit cannot be applied to the resistance; and a compensation circuit putting the resistance damping circuit into the operative state when the modulation circuit is switched from the oscillatory state to the non-oscillatory state, the compensation circuit returning the resistance damping circuit to the non-operative state when or before the modulation circuit is switched from the non-oscillatory state to the oscillatory state.

11. The tire monitor system according to claim 10, wherein the coil of the antenna resonance circuit has two terminals and the resistance damping circuit comprises the switching element and the resistance connected in series between both terminals of the coil.

12. The tire monitor system according to claim 10, wherein the capacitor of the antenna resonance circuit has two terminals and the resistance damping circuit comprises the switching element and the resistance connected in series between both terminals of the capacitor.

13. The tire monitor system according to claim 10, wherein the capacitor and the coil of the antenna resonance circuit are connected in series into an inductance-capacitance (LC) series circuit having two terminals, and the resistance damping circuit comprises the switching element and the resistance connected in series between both terminals of the LC series circuit.

14. The tire monitor system according to claim 11, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

15. The tire monitor system according to claim 12, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

16. The tire monitor system according to claim 13, wherein the modulation circuit includes an AND circuit having an input side to which the control circuit and the oscillation circuit are connected and an output side to which the antenna resonance circuit is connected, the switching element of the resistance damping circuit comprises a transistor having an on-off control terminal, and the compensation circuit includes a NOT circuit having an input side connected to the control circuit in common with the AND circuit and an output side connected to the on-off control terminal of the transistor.

* * * * *